United States Patent
Ghosh et al.

(10) Patent No.: US 10,521,497 B2
(45) Date of Patent: Dec. 31, 2019

(54) MAINTAINING SEMANTIC INFORMATION IN DOCUMENT CONVERSION

(71) Applicant: Adobe Inc.

(72) Inventors: Dibyajyoti Ghosh, San Jose, CA (US); Vivek K. Hebbar, Cupertino, CA (US); Matthew R B Hardy, San Jose, CA (US); Leonard D Rosenthol, Huntingdon Valley, PA (US); Jie-Wei Li, San Jose, CA (US); Anatole A. Matveief, San Jose, CA (US); Rik Cabanier, Seattle, WA (US)

(73) Assignee: Adobe Inc., San Jose, CA (US)

(*) Notice: Subject to any disclaimer, the term of this patent is extended or adjusted under 35 U.S.C. 154(b) by 210 days.

(21) Appl. No.: 15/729,348

(22) Filed: Oct. 10, 2017

(65) Prior Publication Data
US 2019/0108204 A1    Apr. 11, 2019

(51) Int. Cl.
| G06F 17/20 | (2006.01) |
| G06F 17/21 | (2006.01) |
| G06F 17/22 | (2006.01) |
| G06F 16/958 | (2019.01) |
| G06F 17/27 | (2006.01) |

(52) U.S. Cl.
CPC .......... *G06F 17/218* (2013.01); *G06F 16/958* (2019.01); *G06F 17/2247* (2013.01); *G06F 17/2264* (2013.01); *G06F 17/272* (2013.01); *G06F 17/2785* (2013.01)

(58) Field of Classification Search
None
See application file for complete search history.

(56) References Cited

U.S. PATENT DOCUMENTS

| 5,721,938 A * | 2/1998 | Stuckey | G06F 17/271 704/2 |
| 7,873,899 B2 * | 1/2011 | Singh | G06F 16/258 715/234 |
| 2006/0288265 A1 * | 12/2006 | Brookler | G06F 17/218 715/202 |
| 2014/0324808 A1 * | 10/2014 | Sandhu | G06F 17/2785 707/706 |
| 2018/0246857 A1 * | 8/2018 | Arsovski | G06F 17/227 |

* cited by examiner

*Primary Examiner* — Shahid K Khan
(74) *Attorney, Agent, or Firm* — Keller Jolley Preece

(57) ABSTRACT

The present disclosure is directed toward systems and methods for maintaining semantic information in a document from a web page. For example, one or more embodiments described herein encode unique colors into an HTML DOM associated with a web page prior to passing the HTML DOM through an existing rendering engine. In response to receiving a color-coded graphical objects representative of the HTML DOM, systems and method described herein apply the original semantic attributes of the web page into the graphical objects based on the unique color encoding.

20 Claims, 12 Drawing Sheets

Puppies 4 Sale! ~104a

We now have puppies of many different breeds ready for adoption. All of our puppies are registered and are up to date on their vaccinations. We raise our puppies in our home and shower them with love. The puppies come with a travel kennel, puppy food, papers, and his/her favorite toys. ~106a Our mission is to provide your family with the perfect pet. We raise our dogs to have great temperments and to be loving with children and other pets. Click the links below to look at our available puppies.

- Small Dogs
- Medium Dogs ~108a
- Large Dogs

*Fig. 1A*
(Prior Art)

```
<HTML>
<body>
    <div id="content">
        <h1><u>Puppies 4 Sale!</u></h1>  }—304a
        <p> We now have puppies of many different breeds ready for adoption.  All
of our puppies are registered and are up to date on their vaccinations.  We raise our
puppies in our home and shower them with love.  The puppies come with a travel
kennel, puppy food, papers, and his/her favorite toys. </p>
        <p> Our mission is to provide your family with the perfect pet.  We raise
our dogs to have great temperments and to be loving with children and other pets.  Click
the links below to look at our available puppies. </p>                                }—304b
        <hr>
    </div>
    <div id="nav">
        <ul>
            <li> • Small Dogs </li>
            <li> • Medium Dogs </li>  }—304c
            <li> • Large Dogs </li>
        </ul>
    </div>
</body>
</html>
```

*Fig. 3B*

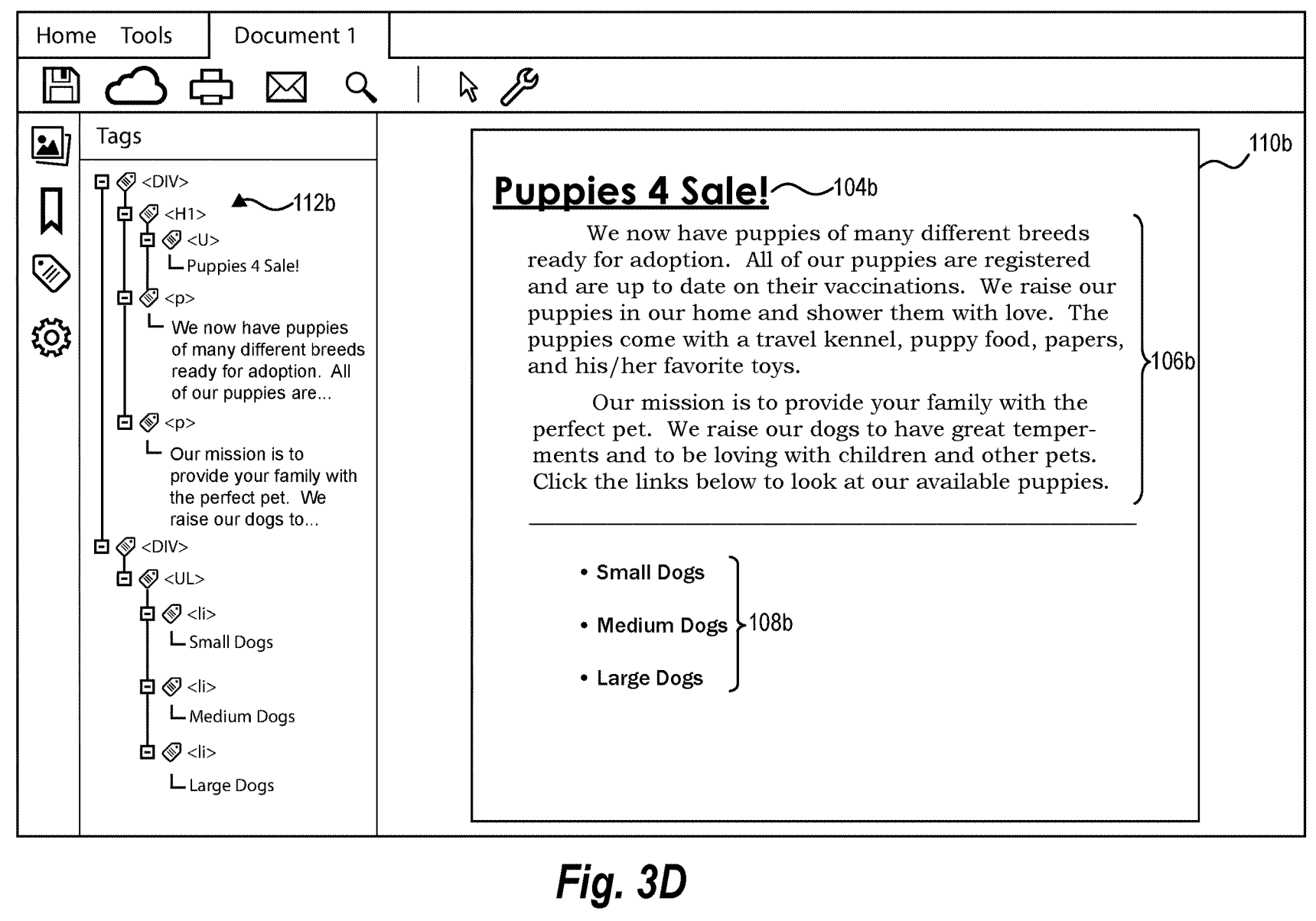

Puppies 4 Sale! ~104b

We now have puppies of many different breeds ready for adoption. All of our puppies are registered and are up to date on their vaccinations. We raise our puppies in our home and shower them with love. The puppies come with a travel kennel, puppy food, papers, and his/her favorite toys.

Our mission is to provide your family with the perfect pet. We raise our dogs to have great temperments and to be loving with children and other pets. Click the links below to look at our available puppies.

- Small Dogs
- Medium Dogs   }108b
- Large Dogs

*Fig. 3D*

Tags

- `<DIV>`
  - `<H1>`
    - `<U>`
      - Puppies 4 Sale!
  - `<p>`
    - We now have puppies of many different breeds ready for adoption. All of our puppies are...
  - `<p>`
    - Our mission is to provide your family with the perfect pet. We raise our dogs to....
- `<DIV>`
  - `<UL>`
    - `<li>` Small Dogs
    - `<li>` Medium Dogs
    - `<li>` Large Dogs

MAINTAINING SEMANTIC INFORMATION IN DOCUMENT CONVERSION

BACKGROUND

Document conversion is a popular way for users to leverage information across media platforms. For example, in order to utilize web page information in a report or presentation, a user may convert the webpage to another type of document (e.g., a PDF document). Thus, the user is left with an electronic document including the web page information that can be used for more versatile purposes. For instance, the user may utilize the converted electronic document to extract text, mine data, and otherwise leverage the information in the converted electronic document.

Several problems exist, however, with conventional document conversion techniques. For example, conventional document conversion techniques are lossy and typically do not carry forward much of the structural and other semantic information incorporated into the web page. To illustrate, a typical web browser displays a web page based on underlying hyper-text markup language ("HTML"). The underlying HTML includes semantic information that dictates how text and other elements are displayed (e.g., display positions, font size, pixel color). For example, as illustrated in FIG. 1A, the web page 102 includes elements such as a heading 104a, text 106a, and a bulleted list 108a. As shown in FIG. 1A, the heading 104a is bold with a large font size, while the text 106a has a smaller font size and different margins, and the bulleted list 108a has a different font and margins. These semantic attributes are generally conveyed in HTML as part of HTML tags associated with each displayed element.

Additionally, the underlying HTML associated with a web page also organizes the semantic information associated with display elements into a structural hierarchy that dictates how the display elements relate to each other. For example, as shown in FIG. 1A, the HTML tags defining the heading 104a and the text 106a may be nested within a first style definition tag, while the bulleted list 108a may be nested within a second style definition tag. This structural hierarchy carries important semantic information about the associated web page 102.

Due to the nature of HTML, however, conventional document conversion techniques do not carry through the semantic information conveyed in HTML tags or the associated structural hierarchy to a document converted from HTML. Thus, while the resulting converted document may include the text and other display elements from the web page, the relationships between the various text and other display elements are lost. For example, as shown in FIG. 1B, an example PDF document, PDF 110a, that results from the typical conversion of the web page 102 (e.g., as shown in FIG. 1A) includes the elements from the web page 102, but the structural hierarchy indicated within the tag hierarchy 112a is empty. This is because the structural relationships between the tags rendered into the PDF 110a have been lost to conventional document conversion techniques.

Accordingly, due to this loss of semantic information, the converted document fails to convey how groups of text and display elements relate to each other (e.g., due to loss of headings, rearranging of paragraphs and other text groupings), as well as the order in which the document should be read (e.g., due to loss of structural information that defined columns, paragraphs, margins, indents). As shown in FIG. 1B, due to the loss of semantic information of the original web page, the resultant PDF is inaccurate and lacks identification of tables, paragraphs, lists etc. Furthermore, the resultant PDF does not indicate if given text is part of a paragraph or an image caption in web page. The lack of tagged content in the resultant PDF often leads to a bad user experience because the resultant PDF is not easily readable on screens of varying form factors like smartphones, smartwatches etc. Furthermore, it is difficult to discern the author's intent and intended user experience.

Some conventional HTML to PDF generators have web capture capabilities. Such conventional HTML to PDF generators, however, are typically coded to a specific web browser or rendering engine and require recoding upon updates to the web browser or rendering engine. Furthermore, conventional HTML to PDF generators typically only have limited tagging capabilities or require manual tagging of the resulting PDF.

SUMMARY

One or more embodiments described herein provide benefits and solve the foregoing and other problems in the art with systems, computer-readable media, and methods that convert a page in a scripting language into a document while maintaining the semantic and structural information of the page. For example, the systems and methods described herein use the color properties of nodes in an HTML data object model (DOM) representing a web page to convey semantic information through the conversion process. In particular, the systems, computer-readable media, and methods described herein encode the semantic and structural information in color properties. As the color properties are retained in the rendering pipeline, the systems, computer-readable media, and methods are to extract the encoded semantic and structural information after the HTML is passed through a rendering engine. Accordingly, the systems, computer-readable media, and methods described herein produce a document that maintains the semantic and structural attributes of the original web page. For example, the systems, computer-readable media, and methods described herein output a rich document that is visually identical to the original web page without requiring any recoding of an existing document conversion engine.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 1A and 1B illustrate a prior art web page and PDF conversion of the web page embodying problems solved by one or more embodiments described herein;

FIG. 3B illustrates HTML markup corresponding to the example web page of FIG. 3A in accordance with one or more embodiments;

FIG. 3D illustrates a PDF document rendered to include semantic and structural information in accordance with one or more embodiments;

DETAILED DESCRIPTION

Figure 1B:
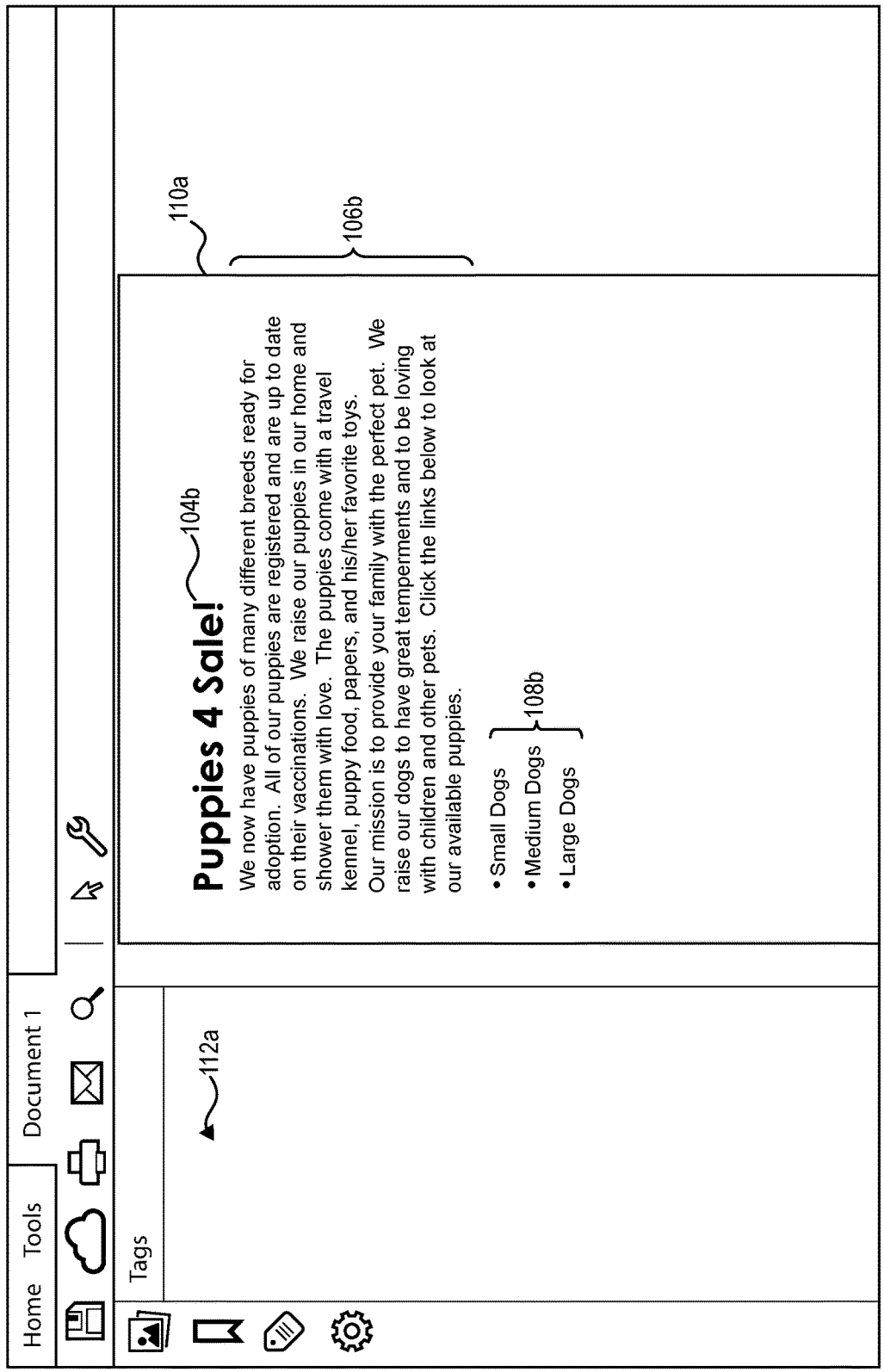

One or more embodiments described herein include a document conversion manager that converts pages in a scripting language into visually and structurally identical documents. In one or more embodiments, the document conversion manager generates a mapping that associates semantic attributes and structural information associated with elements of the web page with unique colors. The document conversion manager then replaces original colors in the HTML DOM with the unique colors specified by the generated mapping. Because passing the HTML DOM through a rendering engine maintains colors, the semantic and structural information specified by the HTML DOM that is typically lost during the rendering process can be extracted from graphical objects output from the rendering engine based on the unique colors. In particular, in response to receiving graphical objects associated with the HTML DOM output from a rendering engine, the document conversion manager identifies the semantic attributes and structural information in the generated mapping associated with the unique colors of the graphical objects. The document conversion manager then applies the identified semantic attributes and structural hierarchy to the graphical objects to generate constructs. The document conversion manager then assembles the constructs into a finalized document that maintains the semantic information from the web page and includes tags organized into the structural HTML hierarchy extracted from the web page.

To illustrate an example embodiment, the document conversion manager begins the document conversion process by accessing an HTML DOM that represents a web page. The document conversion manager generates a mapping of the attributes and structural information associated with each node in the HTML DOM to unique color codes. For example, in one or more embodiments, the document conversion manager generates the mapping to include an entry for each node in the HTML DOM. For instance, the document conversion manager identifies a combination of one or more semantic attributes and the structural information associated with a node from the HTML DOM. The document conversion manager then adds an entry to the mapping that includes the combination of the one or more semantic attributes and the structural information with a unique color code as an index or lookup key for the entry. In one or more embodiments, the document conversion manager repeats this process for each node in the HTML DOM. In at least one embodiment, the document conversion manager later utilizes the generated mapping to maintain, lookup, and apply semantic attributes and structural hierarchy associated with the web page that would otherwise be lost during typical document conversion processes.

In order for the document conversion manager to apply the semantic attributes and structural information after the HTML DOM is passed through a rendering engine; the document conversion manager substitutes the original color associated with each node in the HTML DOM with the unique color that acts as a lookup key for the corresponding entry in the generated mapping. Accordingly, as the document conversion manager generates the mapping, the document conversion manager overwrites portions of the HTML DOM such that each node in the HTML DOM references a unique color instead of the original color. After the document conversion manager, has mapped and altered all the nodes in the HTML DOM, the document conversion manager provides the HTML DOM to a rendering engine. In one or more embodiments, the document conversion manager saves the generated mapping for later use. Alternatively, the document conversion manager can pass the generated mapping (e.g., as part of a standard system call) to a future part of the rendering pipeline.

In one or more embodiments, the document conversion manager works in combination with any existing rendering engine without requiring any updates, code fixes, or patches for the existing rendering engine that are specific to the document conversion manager. In other words, because the document conversion manager utilizes an existing attribute (e.g., a color attribute) within each node of the HTML DOM, an existing rendering engine may function normally in converting the HTML DOM to graphical objects.

In one or more embodiments, the existing rendering engine receives the HTML DOM and converts the HTML DOM into one or more color-coded graphical objects. For example, a typical rendering engine will convert an HTML DOM node for a block of text into a graphical object that includes the block of text. In the one or more embodiments described herein, the document conversion manager receives the color-coded graphical objects from the rendering engine and extracts the unique colors.

For example, in response to receiving a collection of graphical objects corresponding to nodes in the HTML DOM from the rendering engine and/or a graphics engine, the document conversion manager utilizes the previously generated mapping to alter each of the collection of graphical objects such that when the graphical objects are converted to PDF constructs and assembled into a finalized PDF document, the resulting PDF document is visually identical to the original web page and includes PDF tags that correspond to the structural hierarchy of HTML tags in the original web page. In at least one embodiment, each graphical object corresponds to one of the nodes in the HTML DOM. Additionally, each of the graphical object is color coded with a unique color. Thus, in response to receiving the collection of graphical objects, the document conversion manager utilizes the unique color coded into each graphical object as a lookup key or index into the previously generated mapping to identify semantic and structural information for the graphical object.

The document conversion manager then applies the combination of attributes and structural information in the mapping associated with the unique color to the graphical object. In one or more embodiments, the document conversion manager also applies the original color listed in the corresponding entry in the generated mapping to the graphical object to restore the color of the graphical object from the unique color to the original color. The document conversion manager continues this process with each graphical object received from the rendering engine. In at least one embodiment, the document conversion manager converts the updated graphical objects to PDF constructs (e.g., PDF display elements, marked content, and PDF tags), and assembles the PDF constructs into a finalized PDF document that is visually identical to the web page represented by the HTML DOM. For example, the resulting PDF document includes the display attributes as well as the structural hierarchy featured in the original web page. In this way, the document conversion manager maintains the semantic information of the web page even after the web page is converted to a PDF document. This process is described in greater detail below with reference to FIGS. 3A-3D.

It will be understood that while the document conversion manager is described herein with reference to a process that converts an HTML web page to a PDF document, the document conversion manager can also operate in different document conversion scenarios by converting digital documents from one format to another format. For example, the document conversion manager can convert the output of any document preparation system (e.g., LaTex) to a visually identical graphical composition model (e.g., a PDF document), while maintaining structural and semantic information present in the base document. In another example, the document conversion manager can convert the output of another type of scripting language (e.g., Perl, Tcl, Python) into a document format such as a PDF document. Thus, in one or more embodiments, the document conversion manager is platform or web browser agnostic; meaning the document conversion manager can operate in connection with any platform or web browser.

As shown above, one or more implementations described herein solve the computer-based problem of losing semantic information when converting web pages into PDF documents. Specifically, one or more implementations provide an improvement in computer-related technology by utilizing an existing display attribute (e.g., color) within the HTML DOM to pass semantic and structural information represented within the HTML DOM. By so doing, the document conversion manager provides several advantages over conventional document converters. For instance, the document conversion manager generates a PDF document that retains the semantic and structural information present in an original web page. Thus, important relationships between display elements and visual cues indicated in the original web page are maintained in the generated PDF document.

Moreover, the document conversion manager utilizes existing rendering engines without requiring any additional updates, patches, or code fixes to the existing rendering engine. Accordingly, the document conversion manager is easily and seamlessly incorporated into existing document conversion methods while solving a previously unaddressed problem.

Furthermore, the document conversion manager produces a converted PDF document that maintains the identified semantic and structural information regardless of the display upon which the PDF document is viewed. For example, existing document converters output PDF documents that display differently depending on the aspect ratio of the screen where the PDF documents are viewed. Thus, a conventionally converted PDF document may look similar to a base web page when viewed on a desktop monitor, but may look completely different when viewed on a smartphone display. In one or more embodiments, because the document conversion manager described herein maintains semantic and structural information from the base web page, the resulting converted PDF document remains visually identical to the web page regardless of the type of display upon which the PDF document is viewed.

As used herein, a "web page" refers to a display of rendered hypertext markup language ("HTML") provided by a web browser. In one or more embodiments, a web browser accesses the HTML markup associated with a web page in response to a user inputting a universal resource locator ("URL") into the web browser framework. The web browser then accesses a server host for the HTML markup associated with the URL and renders the HTML markup into a displayed web page. In at least one embodiment, the HTML markup associated with the web page incorporates dynamic content such as cascading style sheets ("CSS"), JavaScript, and so forth. Additionally, as will be described in greater detail below, the HTML markup is organized into a tag hierarchy wherein the HTML tags are hierarchically organized such that some tags, and their associated attributes and content, are nested within other tags.

As used herein, an "HTML data object model" or "HTML DOM" refers to a structured tree representing the information and relationships present in an HTML markup and any associated dynamic content. For example, the HTML DOM can include text and media that is displayed in a web page, as well as the semantic information and structural relationships of the elements of the web page. To illustrate, structural information includes information such as a display positions and element types (e.g., header, foot, etc.), as well as the parent-child relationships represented within the hierarchical organization of the HTML tags. Semantic information such as style attributes include attributes like font size, font type, and color. In one or more embodiments, the HTML DOM is organized so as to maintain the structural hierarchy inherent to the nested tags present in the HTML markup. Additionally, in one or more embodiments, the structured tree of the HTML DOM is made of one or more nodes where each node lists or is associated with one or more attributes. For example, as described above, the attributes associated with an HTML DOM node correlate with display and layout attributes specified by an HTML tag or a cascading style sheet (CSS).

As used herein, a "mapping" refers to a generated data structure that stores semantic and structural information represented with an HTML DOM. In one or more embodiments, the document conversion manager utilizes unique color codes (e.g., RGB color codes, hex color codes) as indexes or lookup keys for the mapping. In at least one embodiment, the mapping is a two-column database where each row includes a unique color code in the first column and a string of characters representing a combination of semantic and structural information in the second column. In one embodiment, the second column of each row in the mapping also includes information that enables access to the HTML DOM. In that embodiment, the document management system can utilize the mapping to access the HTML DOM at runtime in order to extract and apply semantic and structural information to graphical objects. Alternatively, the mapping may be a comma-separated value ("CSV") file, or any other suitable data structure.

As used herein, a "graphical object" refers to the output of a rendering engine or graphics engine. For example, in response to receiving an HTML DOM as input, a conventional rendering engine outputs one or more graphical objects. In one or more embodiments, a graphical object corresponds to a node in the HTML DOM and includes a display element referenced by the corresponding HTML DOM node. For example, if an HTML DOM node references a block of text and its associated semantic and structural information, the corresponding graphical object would include the block of text. As described above, however, conventional rendering engines strip away semantic information from HTML DOM nodes. Accordingly, the corresponding graphical object may include the block of text without any additional information specifying how the block of text should be displayed relative to other graphical objects rendered from the HTML DOM. For example, with regard to FIG. 1A, a conventional rendering engine would render graphical objects associated with each list element in the bulleted list 108a, but each graphical object would not contain any information specifying that they were all part of the same list. This hierarchical information that was present in the HTML DOM would be lost in the convention rendering process.

As used herein, a "document construct" is a component from which a document is assembled. A document construct is one of many types of data structures into which a graphical object can be interpreted. In one or more embodiments, a document construct is a data structure according to a document specification (e.g., PDF specification). For example, the document construct can comprise a PDF construct (e.g., a PDF graphical content construct, PDF marked content, or PDF tagging constructs). A construct can lack semantic, structural, and hierarchical information. For example, conventional processes that convert web pages to PDFs can generate PDF graphical content constructs that lack tags or other information that conveys the semantic, structural, and hierarchical information lost during the conversion process. As used herein "structural constructs" refer to document constructs that include semantic, structural, and/or hierarchical information. Examples of structural constructs include marked constructs and tagging constructs. For example, a PDF marked content includes the display element associated with the graphical object (e.g., a block of text) as well as additional information (e.g., tags or other information indicating semantic, structural, and/or hierarchical information). In one or more embodiments, PDF tagging constructs include tags that define hierarchical relationships between different pieces of marked content (e.g., similar to HTML tags), semantic information, or structural information. As used herein, a "PDF document" refers to a finalized Portable Document Format file. For example, one or more PDF constructs are assembled into a PDF document that can be viewed on a computer display, navigated via user inputs interacting with PDF tagging constructs, printed as a physical document, and stored or transmitted as a single file.

Figure 2:
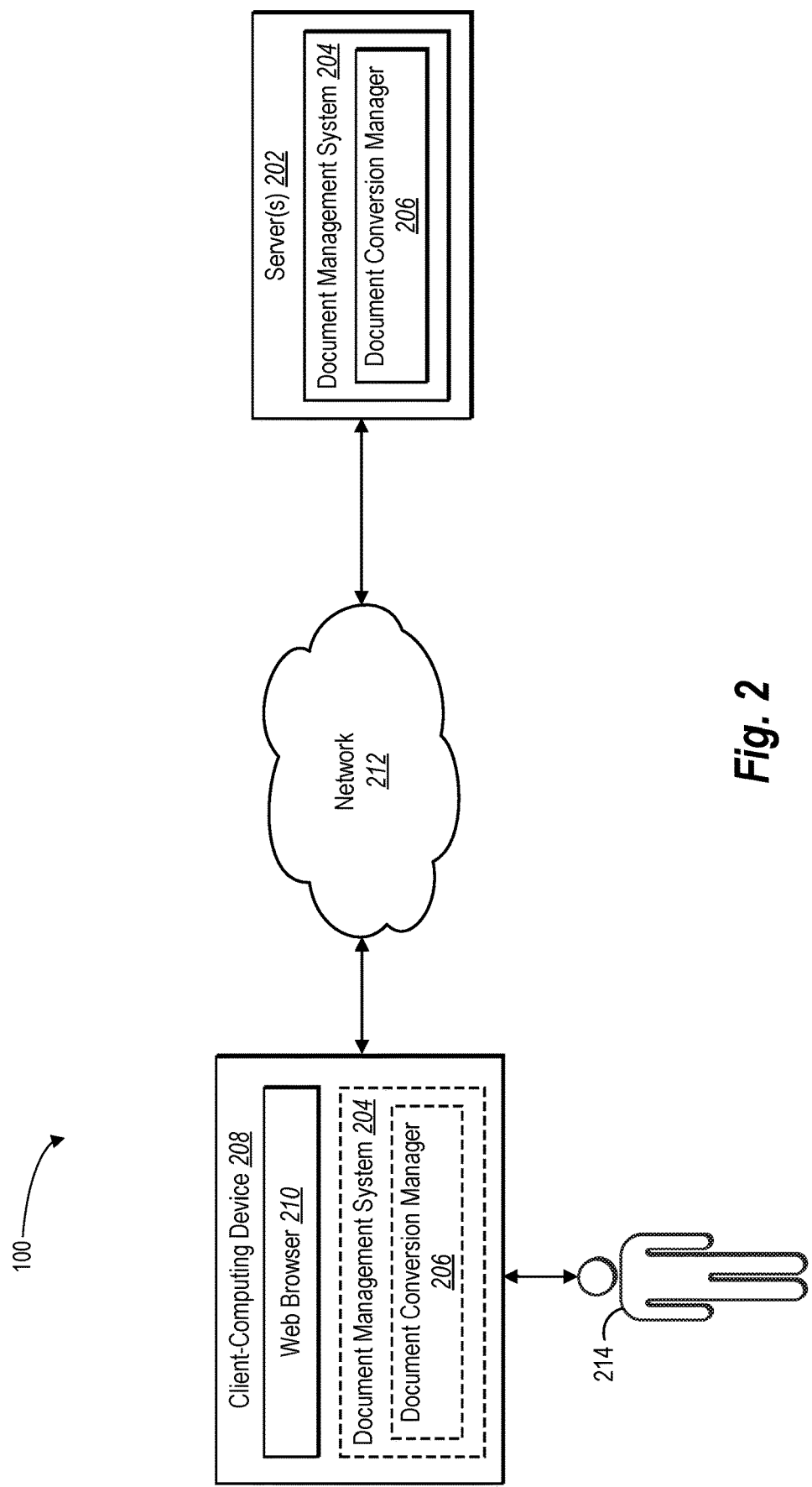
FIG. 2 illustrates a schematic diagram of an environment in which a document management system including a document conversion manager operates in accordance with one or more embodiments.

FIG. 2 provides an overview of an environment 100 in which a document management system 204 including a document conversion manager 206 can operate in accordance with one or more embodiments. As illustrated in FIG. 2, the environment 100 includes a client-computing device 208 having a web browser 210. FIG. 2 also shows server(s) 202 can host the document management system 204 and the document conversion manager 206.

Although FIG. 2 illustrates a particular arrangement of the server(s) 202 and the computing device 208, various additional arrangements are possible. For example, in another embodiment, the document conversion manager 206 may be installed on the computing device 208. For instance, in that embodiment, the document conversion manager 206 may be installed as a web browser plugin on the computing device 208.

While FIG. 2 illustrates a single user 214 and computing device 208 for explanation purposes, the environment may include any number of users. For example, the document conversion manager 206 hosted by the server(s) 202 can provide a service available over the network 212 to any number of users. Examples of client-computing devices may include, but are not limited to, mobile devices (e.g., smartphones, tablets), smart wearables, laptops, desktops, or any other type of computing device. See FIG. 8 for additional information regarding computing devices.

Additionally, in one or more embodiments, the computing device 208 can communicate with the server(s) 202 through the network 212. In one or more embodiments, the network 212 may include the Internet or World Wide Web. The network 212, however, can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. The network 212 is further described with reference to FIG. 8 below.

In one or more embodiments, the client-computing device 208 can send a request to the document management system 204 hosted by the server(s) 202 to convert a web page into a PDF document. For example, the client-computing device 208 can send a URL or an HTML DOM to the document management system 204 hosted by the server(s) 202. The document conversion manager 206 can then convert the web page into PDF document that maintains the semantic, hierarchical, and structural information from the web page. The document management system 204 can then download the finalized PDF document to the client-computing device 208 in response to the request.

Alternatively, the document management system 204 can be implemented by the client-computing device 208. For example, the document management system 204 can comprise a plug-in or software application resident on the client-computing device 204 that locally converts a web page to a PDF document that maintains semantic, hierarchical, and structural information represented in the web page.

Figure 3A:
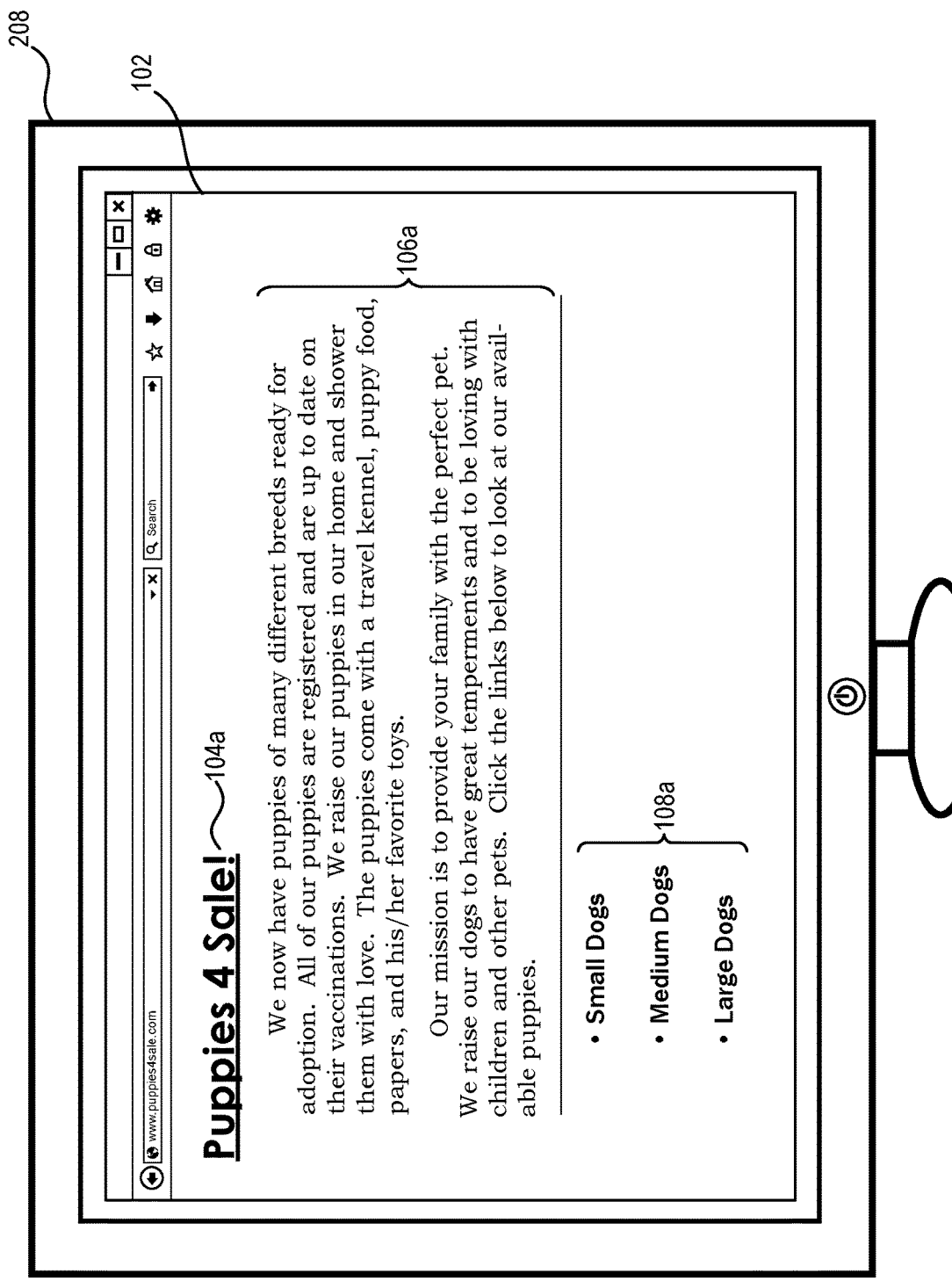
FIG. 3A illustrates an example web page to be converted in accordance with one or more embodiments.

To further explain the features of the document conversion manager, FIG. 3A shows the same web page 102 illustrated in FIG. 1A. In one or more embodiments, the web browser 210 installed on the computing device 208 parses and interprets HTML markup associated with the web page 102 in order to display the heading 104a, the text 106a, and the bulleted list 108a. For example, as shown in FIG. 3B, the web browser 210 parses and interprets the HTML markup 302 in order to display the web page 102 as shown in FIG. 3A.

In one or more embodiments, HTML markup includes various tags that define HTML elements. For example, as shown in FIG. 3B, the HTML markup 302 for the web page 102 includes the element 304a that corresponds with the heading 104a in the web page 102. As further shown in FIG. 3B, the element 304a is defined by the nested HTML tags "<u></u>," "<h1></h1>," "<div id='content'></div>," "<body></body>," and "<HTML></html>." In a similar manner, the HTML file also includes the elements 304b and 304c that corresponds with the text 106a and the bulleted list 108a in the web page 102, respectively.

In at least one embodiment, the HTML tags in the HTML markup 302 dictate semantic, hierarchical, and structural information to the web browser 210 of the computing device 208 that will eventually control how the web browser 210 displays the elements 304a-304c. For example, the element 304b (e.g., that corresponds with the text 106a in the web page 102) is defined by two sets of "<p></p>" tags. Accordingly, these tags dictate that the web browser 210 should display the element 304b as two separate paragraphs. Similarly, the element 304b is further defined by the nested "<div id='content'></div>" tags. In one or more embodiments, these tags dictate that the web browser 210 displays the element 304b according to a CSS definition for "content." This definition can include semantic information such as, but not limited to, font size and type, margin size, line spacing, text color, and background color. Further, this definition can also include structural or hierarchical information including sibling and parent/child relationships represented among the tags that nest within the "<div id='content'></div>" tags.

Figure 3C:
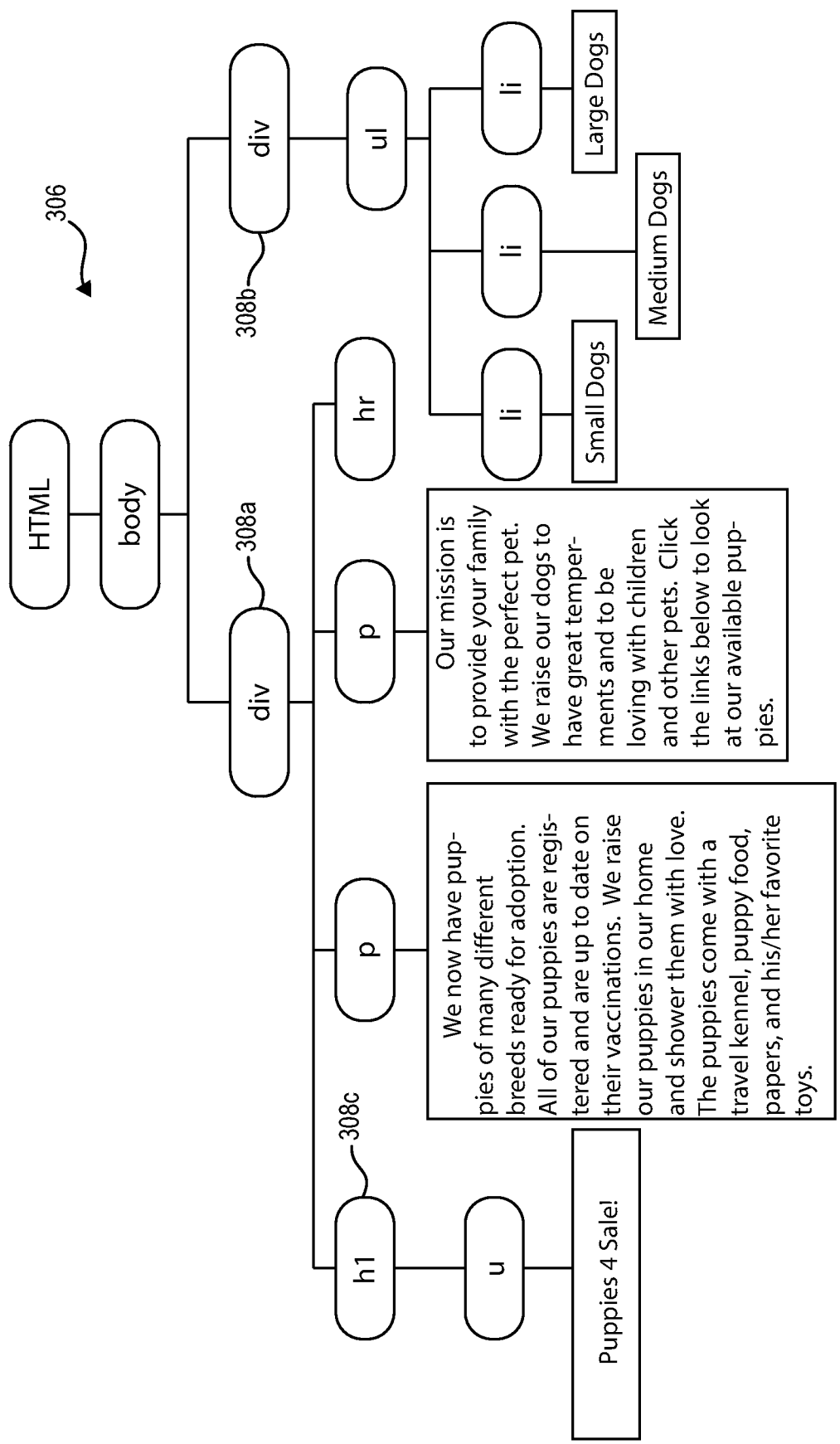
FIG. 3C illustrates a visual representation of an HTML data object model corresponding to the HTML markup of FIG. 3B in accordance with one or more embodiments.

In one or more embodiments, and before the web browser 210 displays the web page 102 that represents the information in the HTML markup 302, the web browser 210 first parses the HTML markup 302 into a DOM (e.g., a data object model). In at least one embodiment, the web browser 210 parses an HTML markup into a DOM so that a rendering engine can more quickly render the HTML markup into a human-readable display. Furthermore, the web browser 210 parses the HTML markup such that the nested hierarchy present in the HTML markup is represented within the tree-structure of the HTML DOM. FIG. 3C illustrates a simplified visual representation of an HTML DOM 306. For example, the web browser 210 parses the HTML markup 302 into the HTML DOM 306. In one or more embodiments, the HTML DOM 306 includes multiple nodes connected along hierarchical lines dictated by the nested tags in the HTML markup 302.

Furthermore, in one or more embodiments, each node in the HTML DOM 306 is associated with various attributes. To illustrate, the node 308a is associated with the "<div id='content'></div>" HTML tags in the HTML markup 302. In one or more embodiments, a CSS definition associated with the HTML markup 302 defines the "content" division or section in the HTML markup 302 to include attributes including, but not limited to, text color (e.g., "black," RGB value "(0,0,0)," hex color code "#000000"), font type (e.g., "Times New Roman," "Calibri"), text alignment (e.g., "right justified," "centered"), and line spacing (e.g., "single," "double"). Accordingly, in parsing the HTML markup 302 into the HTML DOM 306 the web browser 210 incorporates these attributes dictated by an associated CSS into the node 308a.

In one or more embodiments, each node in the HTML DOM 306 includes attribute information. For example, the node 308b is associated with the "<div id='nav'></div>" HTML tags in the HTML markup 302 and include attribute information specific to the "nav" division or section in HTML markup 302 as defined by an associated CSS. Additionally, the associated CSS can include definitions for other HTML tags, such as those associated with the nodes 308c and 308d. For example, the CSS may define a text size (e.g., "16 pt"), line weight (e.g., "bold"), and underline presence associated with the "<h1></h1>" tags.

After parsing the HTML markup 302 into the HTML DOM 306, the web browser 210 typically provides the HTML DOM 306 to a rendering engine which outputs one or more graphical objects corresponding to nodes of the HTML DOM 306. For example, in one or more embodiments, the only attributes from the HTML DOM 306 that a typical rendering engine renders into corresponding graphical objects are color attributes. As described above, typical rendering engines may not render other semantic, hierarchical, and structural information (e.g., text alignment, parent/child relationships) into the graphical object. In one or more embodiments, the document conversion manager 206 solves this problem by substituting unique colors with existing color attributes associated with each node in the HTML DOM 306.

For example, in order to utilize unique colors to convey semantic, hierarchical, and structural information across the document rendering process, the document conversion manager 206 first generates a mapping that associates the attributes of each node in the HTML DOM 306 with a unique color code. To illustrate, the document conversion manager 206 begins at the top of the tree structure within the HTML DOM 306 and traverses through each node in the HTML DOM 306. For each newly encountered node, the document conversion manager 206 identifies the combination of attributes, including an original color, associated with that node. For example, the document conversion manager 206 identifies the combination of attributes as a string of characters listed in or associated with the node.

Next, the document conversion manager 206 determines a unique color code. For example, the document conversion manager 206 may determine the color white (e.g., RGB value (255, 255, 255), hex color value #ffffff) to be the unique color associated with the first node in the HTML DOM 306. For the next node in the HTML DOM 306, the document conversion manager 206 may increment the unique color to RGB value (255, 255, 254), and so forth. Accordingly, depending on the number of nodes in the HTML DOM 306, the document conversion manager 206 may only associate unique colors that are simply slight variations of greyscale. The document conversion manager 206 may begin at any color code in the applicable color space (e.g., RGB, hex) and increment the subsequent color codes backwards or forwards, depending on the initial color code. Alternatively, the document conversion manager 206 can select random colors for the unique colors so long as each color code in the mapping is included a single time (i.e., is unique within the mapping).

Once the document conversion manager 206 determines a unique color code to associate with the combination of attributes identified within a particular node, the document conversion manager 206 adds an entry to the mapping for that unique color/attribute combination pairing. For example, in one or more embodiments, the mapping is a database with two columns and multiple rows. In each row, the document conversion manager 206 adds the unique color (e.g., the RGB value or the hex color value) in the first column, and the combination of attributes (e.g., as a comma separated character string) in the second column. Next, in order to preserve the mapping key or index (e.g., the unique color code) associated with the semantic attribute associated with that node, the document conversion manager 206 encodes the unique color by substituting the original color listed within the attributes for that node in the HTML DOM 306 with the determined unique color. In one or more embodiments, the document conversion manager 206 repeats this process for all nodes in the HTML DOM 306 and then provides the now-color modified HTML DOM 306 to a rendering engine.

In one or more embodiments, the rendering engine (e.g., any existing rendering engine on the computing device 208)

receives the HTML DOM 306 as input and renders the HTML DOM 306 into one or more color coded graphical objects. As a result of the rendering process, one or more semantic, hierarchical, and/or structural attributes included in the HTML DOM 306 other than color are lost. In at least one embodiment, the document conversion process continues when the rendering engine passes the color-coded graphical objects to an existing print engine (e.g., SKIA), which processes the color-coded graphical objects into a format that can be converted into one of many publication types (e.g., PDF, LaTex). At this point, each graphical object corresponds to a node in the HTML DOM 306 and is color coded based on the unique color previously encoded to that node.

In at least one embodiment, in response to receiving the color-coded graphical objects corresponding to nodes in the HTML DOM 306, the document conversion manager 206 utilizes the previously generated mapping to apply original colors and attributes to the graphical objects. For example, the document conversion manager 206 applies original colors and attributes to a graphical object by identifying the unique color encoded to that graphical object. The document conversion manager 206 then utilizes that unique color as a lookup key or index in the generated mapping to identify the combination of semantic, hierarchical, and structural attributes to apply to that graphical object. For instance, if a graphical object is encoded with the color "#f8f8f8" (e.g., very light gray), the document conversion manager 206 identifies that color code in the first column in the generated mapping, then identifies the combination of attributes listed in the second column of the row where that color code is found. The document conversion manager 206 then applies the identified combination of attributes to the graphical object. In one or more embodiments, the document conversion manager 206 repeats this process for each graphical object received from the rendering engine.

After decoding the graphical objects, the document conversion manager 206 converts the graphical objects into PDF constructs (including structural constructs) and packages (e.g., utilizing a service such as PDFPort) the PDF constructs into a finalized PDF document. For example, as shown in FIG. 3D, the document conversion manager 206 produces a PDF document 110b that is visually identical to the web page 102 shown in FIG. 3A. As illustrated in FIG. 3D, the PDF document 110b includes the PDF marked content including heading 104b, the text 106b, and the bulleted list 108b. Unlike the PDF document 110a shown in FIG. 1B, the PDF document 110b also includes PDF structure constructs that retain the semantic attributes shown in the web page 102. Additionally, as shown in the tag hierarchy 112b associated with the PDF document 110b, the PDF tagging hierarchy also includes the hierarchical information (e.g., parent/child, and sibling relationships among PDF tags) represented in the HTML DOM 306 illustrated in FIG. 3C. As such, the document conversion manager 206 has retained the semantic, hierarchical, and structural information without requiring any code changes or patches to the existing rendering engine and/or graphics engine on the computing device 208.

Figure 4:
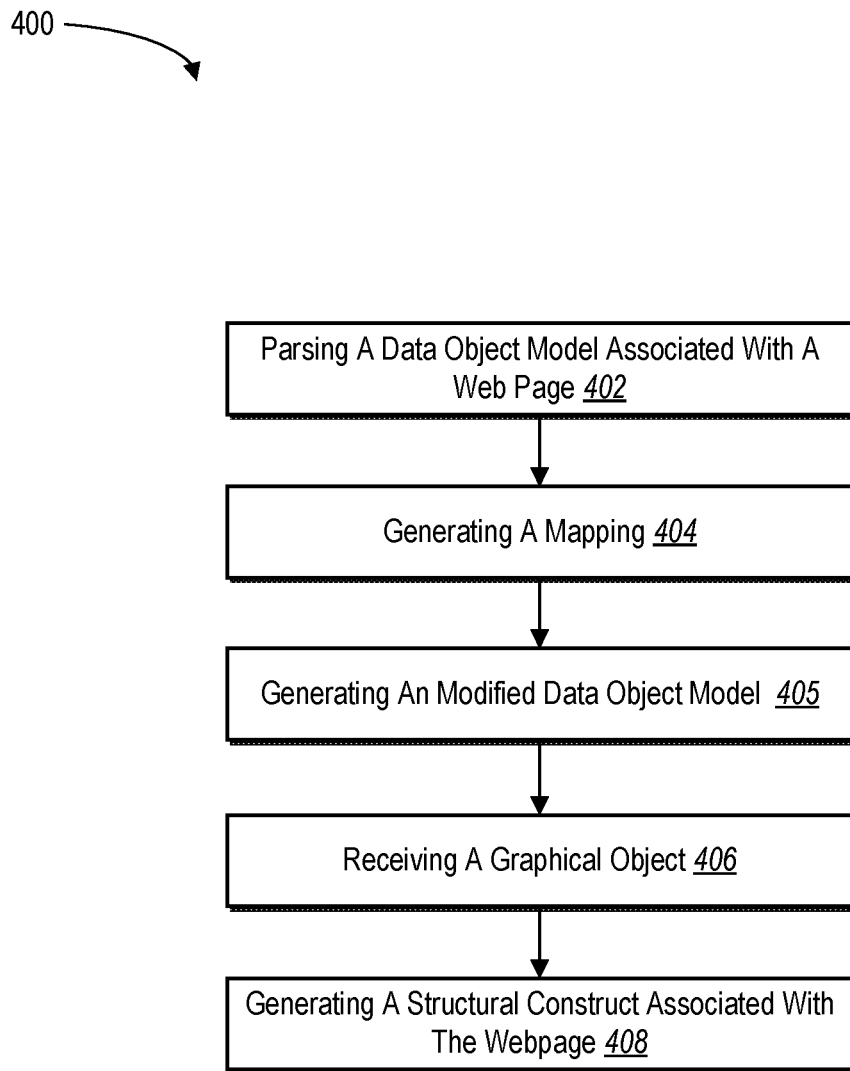
FIG. 4 illustrates a flowchart of steps in converting a web page to a PDF document in accordance with one or more embodiments.

FIGS. 1-3D, the corresponding text, and the examples provide a number of different methods and systems for maintaining semantic, hierarchical, and structural information during the process of converting a web page to a document. In addition to the foregoing, embodiments can also be described in terms of flowcharts comprising acts and steps for accomplishing a particular result. For example, FIG. 4 illustrates a flowchart of acts and steps for maintaining and utilizing semantic, hierarchical, and structural information in document conversion. While FIG. 4 illustrates acts according to one embodiment, alternative embodiments may omit, add to, reorder, and/or modify any of the acts shown in FIG. 4. The acts of FIG. 4 can be performed as part of a method. Alternatively, a non-transitory computer readable medium can comprise instructions, that when executed by one or more processors, cause a computing device to perform the acts of FIG. 4. In still further embodiments, a system can perform the acts of FIG. 4.

As shown in FIG. 4, the series of acts 400 includes an act 402 of parsing a data object model associated with a web page. For example, the act 402 can involve parsing a data object model associated with a web page to extract attributes associated with a node of the data object model, the node corresponding to a display element of the web page having an original color. In one or more embodiments, parsing the data object model associated with a web page to extract attributes associated with the node includes parsing the data object model to extract semantic, hierarchical, and structural attributes associated with the node.

Further, the series of acts 400 includes an act 404 of generating a mapping. For example, the act 404 can involve generating a mapping that associates a unique color code with the extracted attributes of the node of the data object model. In one or more embodiments, generating the mapping that associates a unique color code with the extracted attributes of the node of the data object model includes assigning a unique color to the extracted attributes associated with the node; and adding an entry to the mapping comprising the assigned unique color and the extracted attributes associated with the node. For instance, assigning a unique color to the extracted attributes associated with the node can include incrementally assigning a unique color code starting at one of a color code value of absolute black or a color code value of absolute white Additionally, the series of acts 400 includes an act 405 of generating a modified data object model. For example, the act 405 can involve generating a modified data object model by replacing, within the data object model associated with the web page, an original color code associated with the node with the unique color code. In one or more embodiments, generating the modified data object model by replacing the original color code associated with the node with the unique color code includes overwriting the original color code in the extracted attributes associated with the node with the unique color code.

The series of acts 400 further includes an act 406 of receiving a graphical object. For example, the act 406 can involve receiving a graphical object color coded with the unique color code from a rendering engine. In one or more embodiments, receiving the graphical object color coded with the unique color code from a rendering engine is in response to providing the modified data object model to the rendering engine.

Further, the series of acts 400 includes an act 408 of generating a structural construct associated with the web page. For example, the act 408 can involve generating a structural construct for the display element, based on the generated mapping and the graphical object color coded with the unique color code, that includes the original color and the attributes. In one or more embodiments, generating the structural construct for the display element, based on the generated mapping and the graphical object color coded with the unique color code, that includes the original color and the attributes comprises: determining the unique color code associated with the graphical object; identifying, within the mapping, the determined unique color code and the extracted attributes associated with the unique color code in the mapping; and applying the extracted attributes to the graphical object and substituting the unique color code associated with the graphical object with an original color listed within the extracted attributes. In one or more embodiments, the structural construct can include one or more of PDF marked content, a PDF structural construct, or a PDF tagging construct. Additionally, in at least one embodiment, the series of acts 400 includes an act of assembling the structural construct for the display element into a finalized PDF document.

Figure 5:
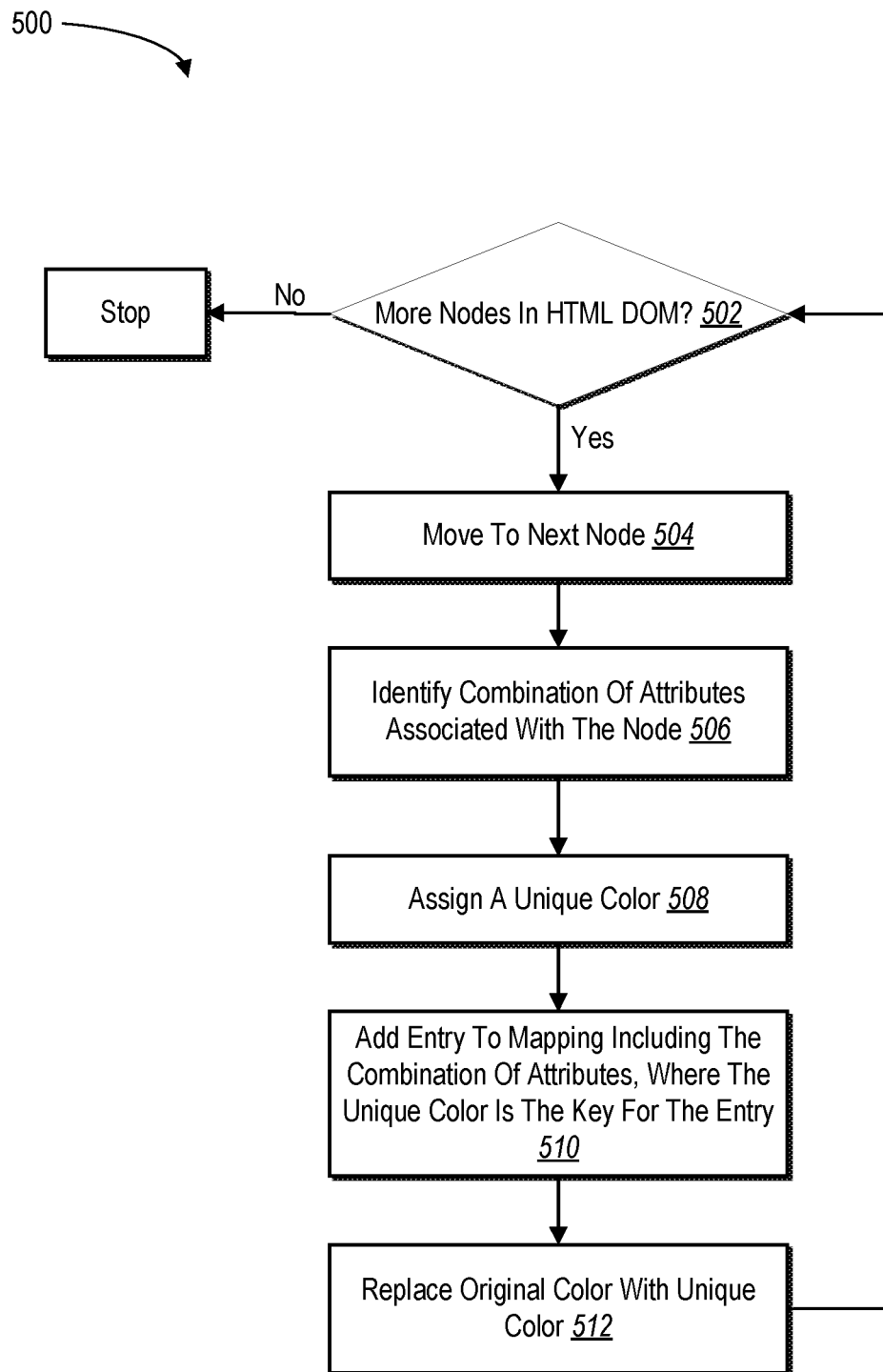
FIG. 5 illustrates a schematic representation of an example algorithm for performing generating a mapping that associates, for nodes of a data object model associated with a web page, attributes with unique color codes in accordance with one or more embodiments.

As mentioned above, in one or more embodiments, the methods and systems for maintaining semantic, hierarchical, and structural information during the process of converting a web page to a PDF document generate a mapping to maintain semantic information. As shown in FIG. 5, steps for generating a mapping that associates, for nodes of a data object model associated with a web page, attributes with unique color codes can be illustrated in a sequence diagram of an algorithm 500 that begins with the act 502 of determining whether there are more nodes in the HTML DOM. If there are more nodes in the HTML DOM (e.g., "yes"), the algorithm 500 involves performing the acts 504, 506, 508, 510, and 512, for each remaining node in the HTML DOM, as will now be described in greater detail.

For example, in response to determining that there are more nodes in the HTML DOM, the algorithm 500 includes the act 504 of moving to the next node in the HTML DOM. For instance, in one or more embodiments, the HTML DOM (e.g., the HTML DOM 306) includes a tree structure of nodes that are hierarchically organized based on the nested HTML tags in an associated HTML markup (e.g., the HTML markup 302). Accordingly, in at least one embodiment, the algorithm 500 moves to the next node in the HTML DOM by traversing the HTML DOM in any one of several tree traversal methods (e.g., in-order traversal, pre-order traversal, post-order traversal). If this is the first iteration of the loop defined by the acts 504, 506, 508, 510, and 512, the act 504 includes moving to the first or top node of the HTML DOM.

For the next node in the HTML DOM, the algorithm 500 then includes an act 506 of identifying a combination of attributes associated with the node. For example, in at least one embodiment, identifying a combination of one or more attributes associated with the node includes parsing attributes associated the node to extract semantic information associated with the node. To illustrate, the combination of one or more attributes can include an original color associated with the node (e.g., a text color associated with the node), other display instructions (e.g., font size, line width, margin size, text alignment) associated with the node, as well as structural or hierarchical information associated with the node. For example, if an underlying web page includes an image defined by an HTML tag that includes alternative text, this alternative text would be lost in a conventional document conversion process. Instead, the act 506 described herein identifies the alternative text as an attribute of the node associated with the displayed image, which enables the document conversion system 204 to maintain this information in the document conversion process. As described above, in one or more embodiments, the combination of one or more attributes is listed within or associated with the node as whitespace separated string of characters. Alternatively, the combination of one or more attributes may be listed as one or more values or codes that represent one or more attributes.

Next, the algorithm 500 includes an act 508 of assigning a unique color. In particular, the act 508 can involve assigning a unique color code to the identified combination of one or more attributes associated with the node. For example, in at least one embodiment, assigning a unique color code to the identified combination of one or more attributes includes incrementally assigning the unique color code starting at the one or more of the value of absolute black or the value of absolute white. In additional iterations of the loop defined by the acts 504, 506, 508, 510, and 512, the document conversion system 100 can increment the unique color code in any appropriate manner (e.g., increment by one, by five).

Following the act 508, the algorithm 500 includes an act 510 of adding an entry to the mapping including the combination of attributes, where the assigned unique color is the key for the entry. In particular, the act 510 can involve adding an entry to the mapping including the assigned unique color and the identified combination of one or more attributes associated with the node. As described above, the mapping may include two columns and multiple rows where each row includes the unique color code in the first column and a string of characters including the combination of one or more attributes for the node in the second column. As described above, the document conversion system 204 extracts the one or more attributes from the HTML DOM. Additionally, the document conversion system 204 can access a CSS object model referenced in the HTML DOM to extract the one or more attributes. In additional or alternative embodiments, the mapping may be formatted in any other data structure such that the unique color acts as a lookup key for an associated combination of one or more attributes.

The algorithm 500 next includes an act 512 of replacing the original color for the node with the unique color. In particular, the act 512 can involve replacing, within the data object model associated with the web page, original colors associated with the one or more nodes with the determined plurality of unique colors. For example, replacing the original color with the unique color can include overwriting the original color listed in the combination of one or more attributes associated with the node with the assigned unique color.

Next, the algorithm 500 steps back to the act 502 and again determines whether there are additional nodes in the HTML DOM. If there are, the algorithm 500 repeats the acts 504, 506, 508, 510, and 512 for the next node in the HTML DOM. If there are no more nodes in the HTML DOM, the document conversion system 100 has a fully generated mapping that maps unique color codes to combinations of attributes extracted from the nodes of the HTML DOM. Additionally, at this point, the document conversion system 100 has modified the HTML DOM with the unique color codes that act as keys to the mapping.

Figure 6:
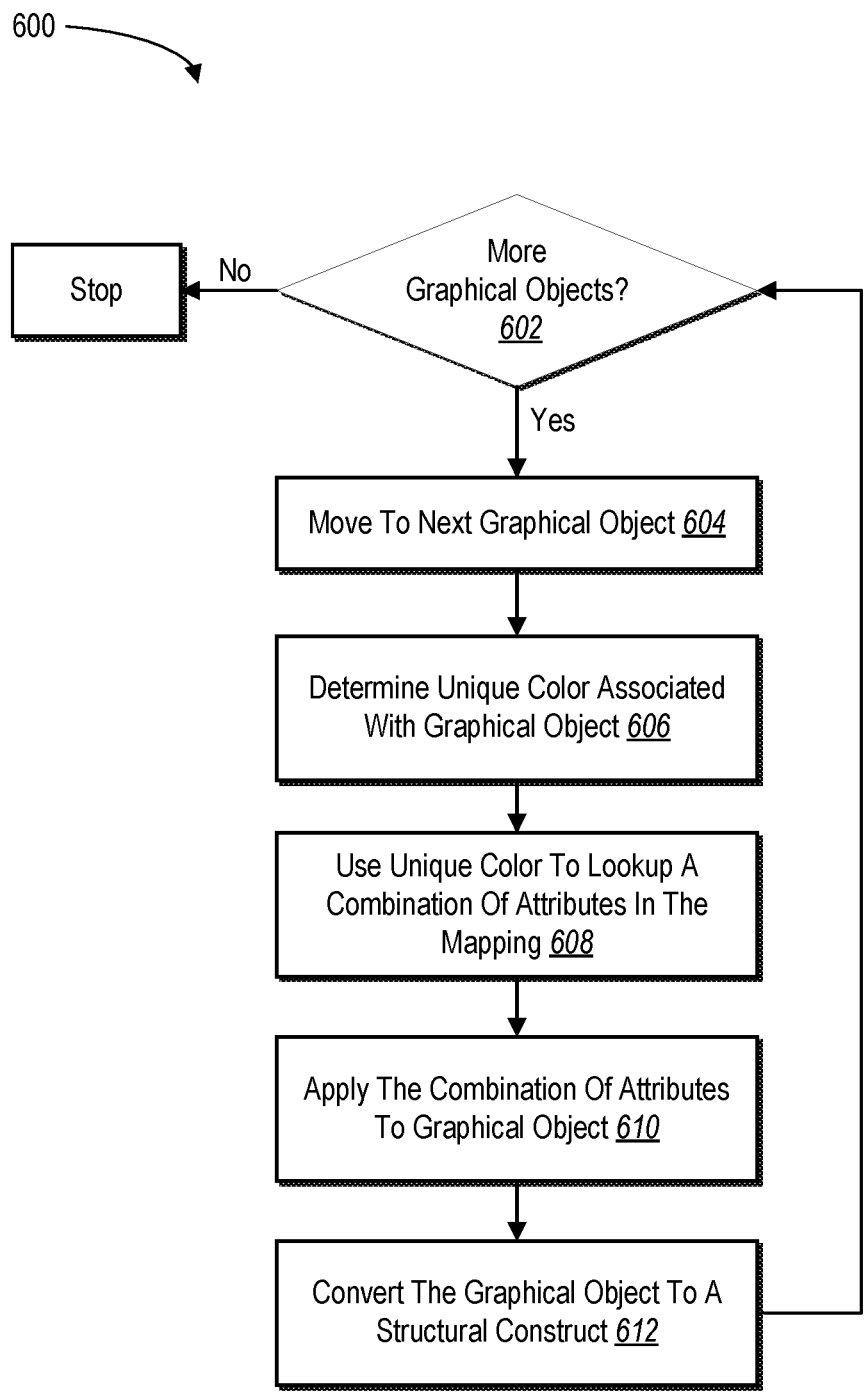
FIG. 6 illustrates a schematic representation of an example algorithm for performing a step for generating PDF constructs, from graphical objects color coded with unique color codes, that include original colors and attributes in accordance with one or more embodiments.

Also, described above, in one or more embodiments, the methods and systems for maintaining semantic, hierarchical, and structural information during the process of converting a web page to a PDF document generates PDF constructs from received graphical objects color coded with unique color codes. FIG. 6 illustrates steps in an algorithm for performing a step for generating PDF constructs from the graphical objects color coded with the unique color codes that includes original colors and the attributes. As illustrated in FIG. 6, the algorithm 600 begins with the act 602 of determining whether there are more graphical objects received from the rendering engine. For example, as described above, the rendering engine outputs one or more color-coded graphical objects associated with nodes from the HTML DOM. If there are more graphical objects (e.g., "yes"), the algorithm 600 involves performing the acts 604, 606, 608, 610, and 612 for each remaining graphical object, as will now be described in greater detail.

For example, in response to determining that there are more graphical objects, the algorithm 600 includes the act 604 of moving to the next graphical object. In at least one embodiment, the graphical object is a color coded and eventually becomes text or another type of display element within a PDF document. If this is the first iteration of the loop defined by the acts 604, 606, 608, 610, and 612 the act 604 includes moving to the first graphical object received from the rendering engine.

Next, the algorithm 600 includes the act 606 of determining the unique color associated with the graphical object. For example, in at least one embodiment, the document conversion system 100 parses the color coded graphical object to determine the unique color code associated with the display object. In other words, the act 606 can include matching the unique color associated with the graphical object to a specific color code. Additionally, the document conversion system 100 may utilize computer vision techniques to determine the unique color code associated with the graphical object.

The algorithm 600 further includes the act 608 of using the unique color associated with the graphical object to lookup a combination of attributes in the mapping. As described above with reference to FIG. 5, the document conversion system 100 generates the mapping where each unique color is associated with a combination of attributes extracted from a node in the HTML DOM. Accordingly, the act 608 performs a lookup on the generated mapping utilizing the unique color from the graphical object to identify the associated combination of attributes. Depending on the system architecture of the computing device 208, the act 608 may involve receiving the generated mapping as part of a system communication (e.g., a system call) or retrieving the generated mapping from a data storage associated with the computing device 208.

Furthermore, the algorithm 600 includes the act 610 of applying the combination of attributes to the graphical object. In particular, the act 610 can involve re-encoding the graphical object by applying the identified combination of attributes to the graphical object. For example, the act 610 can include parsing the combination of attributes (e.g., "text alignment: left" "line spacing: double") and overwriting corresponding attributes associated with the graphical object with these new attributes. The act 610 can further include substituting the unique color associated with the graphical object with an original color identified within the generated mapping. At this point, the graphical object, if finalized for display, would be visually identical to the web page component that corresponds to the HTML DOM node associated with the graphical object.

Accordingly, the algorithm 600 next includes an act 612 of converting the graphical object to a structural construct. As mentioned above, a structural construct includes the display element contained within the graphical object as well as other publisher-specific instructions that inform how the display elements are eventually displayed within a particular environment and structural information including a hierarchy. Thus, the act 612 of converting the graphical object to a structural construct can include converting the graphical object to one or more of PDF marked content, PDF structural constructs, and PDF tagging constructs. For example, PDF marked content includes the display element contained within the graphical object, while a PDF structural construct can include instructions detailing how the display element will be displayed within a finalized PDF document.

Next, the algorithm 600 steps back to the act 602 and again determines whether there are additional graphical objects. If there are more graphical objects, the algorithm 600 repeats the acts 604, 606, 608, 610, and 612 for the next graphical object received from the rendering engine. If there are no more graphical objects, the document conversion system 100 providing the PDF constructs to a document engine (e.g., PDFPort, PDFL) that finalizes the PDF constructs into a PDF document. In at least one embodiment, the resulting PDF document is visually identical to the web page (e.g., the web page 102) upon which the HTML DOM is based.

Figure 7:
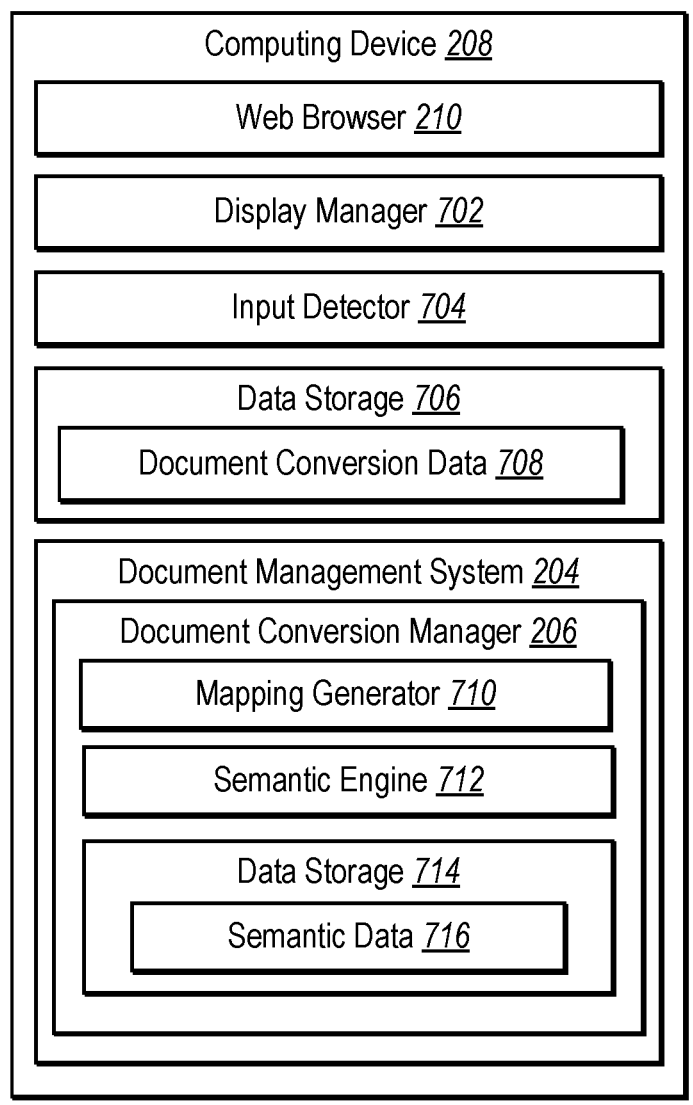
FIG. 7 illustrates a schematic diagram of a document management system including a document conversion manager in accordance with one or more embodiments.

FIGS. 1A-6 and their related descriptions detail the various functions and features of the document conversion system 204. FIG. 7 illustrates an example architecture for the document conversion system 204. For example, as shown in FIG. 7, the computing device 208 includes a web browser 210, a display manager 702, an input detector 704 and a data storage 706. The computing device 208 also includes the document management system 204 which operates the document conversion manager 206. The document conversion manager 206 includes the mapping generator 710, the semantic engine 712, and the data storage 714.

Although the disclosure herein shows components to be separate in FIG. 7, any of the components may be combined into fewer components, such as into a single facility or module, or divided into more components as may serve one or more embodiments. In addition, the components of the document management system 204 may be located on, or implemented by, one or more computing devices, such as those described below in relation to FIG. 8. For example, in one embodiment, the document management system 204 may be installed as a native application or web browser plugin on the computing device 208. In another embodiment, the computing device 208 may be a server that provides a standalone document conversion service that receives a URL as input, and provides as output a PDF document representing the web page at that URL.

In one or more embodiments, the components of the document management system 204 comprise software, hardware, or both. For example, the components of the document management system 204 can comprise computing instructions stored on a non-transitory computer-readable storage medium and executable by at least one processor of the computing device 208. When executed by the at least one processor, the computer-executable instructions cause the computing device 208 to perform the methods and processed described herein. Alternatively, the components of the document management system 204 can comprise hardware, such as a special purpose processing device to perform a certain function or group of functions. Additionally, the components of document management system 204 can comprise a combination of computer-executable instructions and hardware.

As shown in FIG. 7, and as mentioned above, the computing device 208 includes a web browser 210. As discussed above, in response to receiving user input indicating a particular URL (e.g., via a typed input, via a hyperlink click) the web browser 210 requests an HTML file and other dynamic information from one or more remote servers. The web browser 210 then utilizes a rendering engine and a graphics engine to render the received HTML markup and other dynamic information into a human readable web page display. In one or more embodiments, the web browser 210 may include one or more components of the document management system 204 as web browser plugins.

As mentioned above, and as shown in FIG. 7, the computing device 208 includes the display manager 702. The display manager 702 provides, manages, or controls a graphical user interface (or simply GUI or user interface) that allows a user to view and interact with the web browser 210, as well as with other document viewers (e.g., a PDF document viewer). Likewise, the display manager 702 provides a user interface that displays information received from the document conversion manager 206.

More specifically, the display manager 702 facilitates the display of a user interface (e.g., by way of a display associated with the computing device 208). For example, the display manager 702 composes a user interface of a plurality of graphical components, objects, or elements that allow a user to interact with the document conversion system 100. More particularly, the display manager 702 directs the computing device 208 to display a group of graphical components, objects, or elements as directed by the document conversion system 100, as will be described further below.

As further illustrated in FIG. 7, the computing device 208 includes an input detector 704. In one or more embodiments, the input detector 704 detects, receives, or facilitates user input in any suitable manner. In some examples, the input detector 704 detects one or more user interactions with respect to the user interface. As referred to herein, a "user interaction" means a single interaction, or combination or interactions, received from a user by way of one or more input devices.

For example, the input detector 704 detects a user interaction from a keyboard, mouse, touch pad, touch screen, a microphone, or any other input device. In the event that the computing device 208 includes a touch screen, the input detector 704 can detect one or more touch gestures (e.g., swipe gestures, tap gestures, pinch gestures, or reverse pinch gestures) that form a user interaction. In some examples, a user provides the touch gestures in relation to, or directed at, one or more graphical objects or graphical elements of a user interface. Also in some examples, the computing device 208 includes a microphone. In that case, the input detector 704 can use voice translation technology in order to utilize user voice input commands.

The input detector 704 may additionally, or alternatively, receive data representative of a user interaction. For example, the input detector 704 may receive one or more user commands from the user, or any other suitable user input. The input detector 704 may receive input data from one or more components of the document conversion manager 206, from the data storage 706, or from one or more remote locations.

The document management system 204 can perform one or more functions in response to the input detector 704 detecting user input or receiving other data. Generally, a user can control, navigate, and otherwise interact with the document management system 204 by providing one or more user inputs that the input detector 704 detects. For example, in response to the input detector 704 detecting user input, one or more components of the document conversion system 100 can receive an HTML DOM, generate a mapping associated with the HTML DOM, and so forth.

Also, as mentioned above, the computing device 208 includes a data storage 706. The data storage 706 stores and maintains document conversion data 708 representative of document conversion information such as, but not limited to, an HTML DOM, a generated mapping, and so forth.

Furthermore, as illustrated in FIG. 7, the computing device 208 includes the document management system 204. In one or more embodiments, the document management system 204 is a service accessible by one or more users over a network (e.g., the network 212). For example, the document management system 204 may include cloud storage services, document editing services, and document conversion services. In at least one embodiment, a document management system user (e.g., the user 214 of the computing device 208) may access any of these services remotely via the web browser 210.

As mentioned above, the document management system 204 runs the document conversion manager 206. In one or more embodiments, the document conversion manager 206 handles all activities in converting a web page to a PDF document. As illustrated in FIG. 7, the document conversion manager 206 includes the mapping generator 710, the semantic engine 712, and the data storage 714.

In one or more embodiments, the mapping generator 710 handles all activities associated with generating a mapping based on unique color codes. For example, the mapping generator 710 first receives an HTML DOM. As discussed above, the mapping generator 710 can receive the HTML DOM from the web browser 210. Furthermore, the mapping generator 710 then traverses the HTML DOM in order to identify the one or more nodes of the HTML DOM. In at least one embodiment, the mapping generator 710 can receive the HTML DOM from a JAVASCRIPT engine within the web browser 210.

As discussed above, the mapping generator 710 also identifies a combination of attributes associated with each HTML DOM node. For example, in one or more embodiments, the mapping generator 710 identifies attributes associated with a node by parsing all the text associated with the node to identify HTML tags, descriptive text, and coded values. Furthermore, the mapping generator 710 also identifies structural attributes associated with a node by analyzing the node's position in the HTML DOM relative to the other nodes in the HTML DOM. In at least one embodiment, the mapping generator 710 concatenates the identified attributes into a single, comma separated string of characters.

Furthermore, in one or more embodiments, the mapping generator 710 also determines a unique color code to associate with the combination of attributes associated with a node. For example, in one embodiment, the mapping generator 710 begins with the color code for absolute black or absolute white. Then in future iterations, the mapping generator 710 increments the beginning color by a standard increment in order to determine the next unique color code. It follows that, depending on the number of nodes in the HTML DOM, the mapping generator 710 will not determine a wide range of unique color codes within the standard color space. Rather, the mapping generator 710 will likely determine a range of almost-black color codes or almost-white color codes. Alternatively, the mapping generator 710 may begin with any color code within the standard color space, and increment or decrement the beginning color code in order to determine unique color codes for future iterations.

After identifying a combination of attributes associated with a node and determining a unique color code, mapping generator 710 generates a mapping by adding an entry to the mapping that includes the combination of attributes and the unique color code. As discussed above, in one or more embodiments, the mapping generator 710 structures the generated mapping such that the unique color code is the lookup key or index that points to the combination of attributes. In at least one embodiment, the mapping generator 710 generates the mapping as a two-column database. In alternative embodiments, the mapping generator 710 generates the mapping as any appropriate data structure (e.g., a linked list, a CSV file).

In one or more embodiments, the mapping generator 710 also provides the generated mapping on request. For example, in at least one embodiment, the operations of the document management system 204 are performed at different points along the document conversion process. Accordingly, it may be necessary in that embodiment, to provide the generated mapping to a different part of the process at some point after the mapping is generated. Thus, the mapping generator 710 can provide the generated mapping as part of a system call or communication. Additionally, the mapping generator 710 can store and retrieve the generated mapping from the data storage 714.

As mentioned above and as shown in FIG. 7, the document conversion manager 206 also includes the semantic engine 712. In one or more embodiments, the semantic engine 712 performs the tasks necessary to ensure semantic and structural attributes of a web page (or another base document) are applied to a PDF document (or another document). For example, in at least one embodiment, and in response to the mapping generator 710 adding an entry associated with an HTML DOM node to the generated mapping, the semantic engine 712 overwrites or otherwise sets the unique color code (e.g., the index to the newly added entry in the mapping) in the node, such that the original color attribute (e.g., an original color code) of the node is the unique color code. As discussed above, a typical rendering engine maintains an HTML DOM node's color during the rendering process. Accordingly, the semantic engine 712 ensures that the mapping key or index is maintained through the rendering process by overwriting or setting the unique color code as the color attribute of the node, prior to the rendering process.

Additionally, after the rendering process is complete, the semantic engine 712 receives one or more graphical objects from a rendering engine, and determines the unique color code associated with each graphical object. For example, the semantic engine 712 can determine the unique color code associated with a graphical object by analyzing metadata associated with the graphical object, or by utilizing computer vision techniques. After determining the unique color code associated with a graphical object, the semantic engine 712 utilizes that color code as a lookup key or index in connection with the generated mapping. In response to finding the unique color code in the mapping, the semantic engine 712 also identifies the combination of attributes that should be applied to the graphical object.

It follows that the semantic engine 712 next applies the identified attributes to the graphical object. In at least one embodiment, the semantic engine 712 applies the identified attributes by first parsing the identified attributes into discrete segments. For example, the semantic engine 712 may utilize natural language processing, machine learning, or other text processing techniques to parse the identified attributes into segments. In one or more embodiments, the semantic engine 712 then applies the discrete segments to the graphical object such that the display attributes of the graphical object match the discrete segments. For example, this process may involve adding changing the alignment, adding a hierarchical relationship, etc.

In one or more embodiments, the semantic engine 712 can also convert the graphical objects to PDF constructs. For example, as described above, PDF constructs can include PDF marked content, PDF structural constructs, and PDF tagging constructs. In one or more embodiments, the semantic engine 712 can utilize SKIA graphics library with custom SKIA to AGM converter, convert the graphical objects to PDF constructs using PDFPort+PDFL. Additionally, the semantic engine 712 can provide the PDF constructs to a document service, in order to receive a finalized PDF document assembled out of the PDF constructs. As discussed above, the finalized PDF document is the exact representation of the original web page and includes all of the semantic and structural or hierarchical information from the original web page.

Also, mentioned above, the document conversion manager 206 includes a data storage 714. The data storage 714 stores and maintains semantic data 716 representative of semantic information such as, but not limited to, a generated mapping, a PDF rendering, and so forth.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
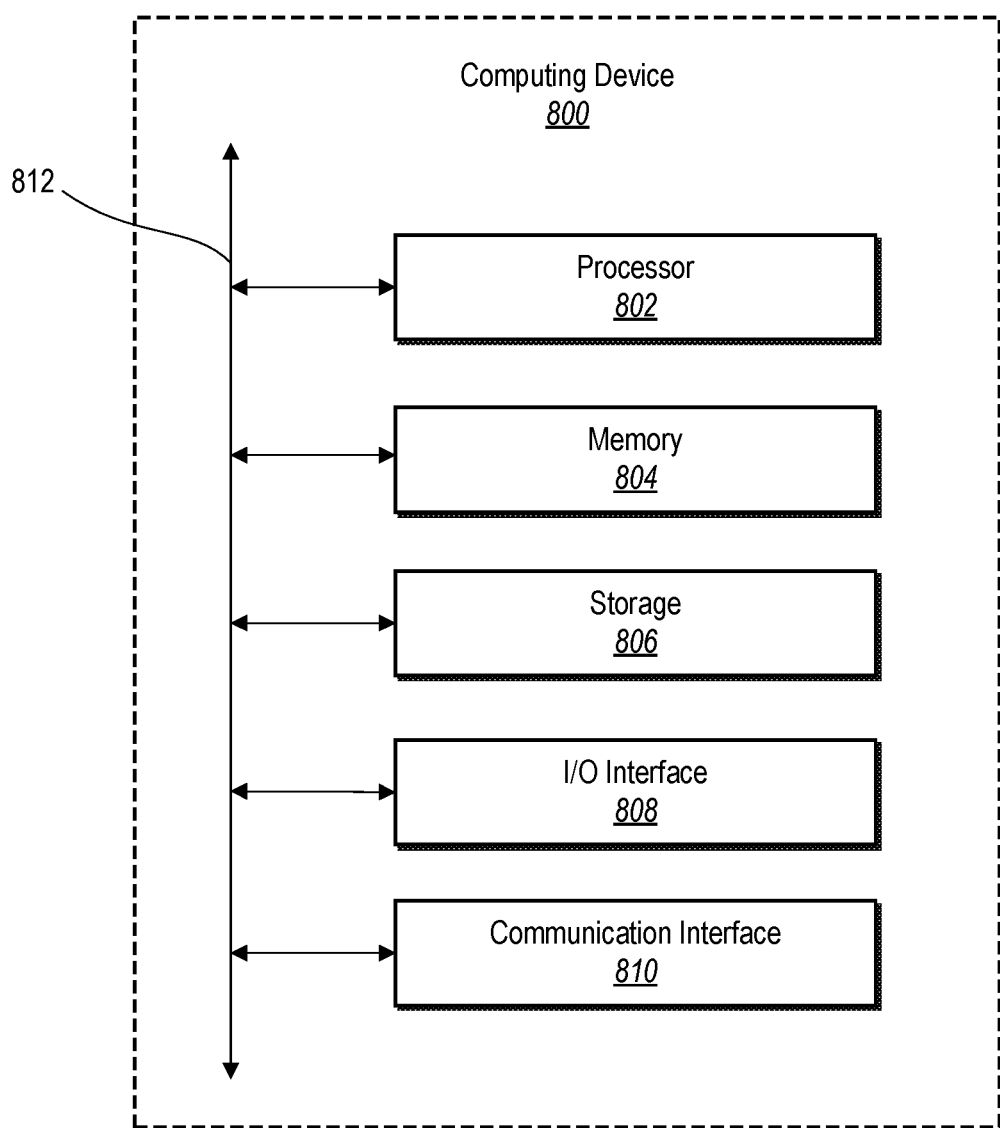
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the document conversion manager 206 can be implanted on implementations of the computing device 800. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory. In one or more embodiments, the memory 804 stores or comprises the data storage.

The computing device 800 includes a storage device 806 includes storage for storing data or instructions. As an example, and not by way of limitation, storage device 806 can comprise a non-transitory storage medium described above. The storage device 806 may include a hard disk drive (HDD), flash memory, a Universal Serial Bus (USB) drive or a combination of these or other storage devices. In one or more embodiments, the storage device 806 stores or comprise the data storage.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

We claim:

1. A non-transitory computer readable storage medium comprising instructions that, when executed by at least one processor, cause a computing device to:
   parse a data object model associated with a web page to extract attributes associated with at least one node of the data object model, the at least one node corresponding to a display element of the web page having an original color;
   generate a mapping that associates a unique color code with the extracted attributes of the at least one node of the data object model;
   generate a modified data object model by replacing, within the data object model associated with the web page, an original color code associated with the at least one node with the unique color code;
   provide the modified data object model comprising the unique color code to a rendering engine;
   receive a graphical object color coded with the unique color code from the rendering engine; and
   generate a structural construct that includes the original color and the attributes of the at east one node of the data object model by applying the mapping to the graphical object color coded with the unique color code.

2. The non-transitory computer readable storage medium as recited in claim 1, wherein the instructions, when executed by the at least one processor, cause the computing device to generate the mapping that associates the unique color code with the extracted attributes of the at least one node of the data object model by:
   assigning a unique color to the extracted attributes associated with the at least one node; and
   adding an entry to the mapping comprising the assigned unique color and the extracted attributes associated with the at least one node.

3. The non-transitory computer readable storage medium as recited in claim 2, wherein the instructions, when executed by the at least one processor, cause the computing device to parse the data object model associated with the web page to extract the attributes associated with the at least one node by parsing one or more CSS object models to extract structural, semantic, and stylistic attributes associated with the web page.

4. The non-transitory computer readable storage medium as recited in claim 3, wherein the instructions, when executed by the at least one processor, cause the computing device to assign the unique color to the extracted attributes associated with the at least one node by incrementally assigning unique color codes starting at one of a color code value of absolute black or a color code value of absolute white.

5. The non-transitory computer readable storage medium as recited in claim 1, wherein the instructions, when executed by the at least one processor, cause the computing device to generate the modified data object model by replacing the original color code associated with the at least one node with the unique color code by overwriting the original color code in the extracted attributes associated with the at least one node with the unique color code.

6. The non-transitory computer readable storage medium as recited in claim 1, wherein the instructions, when executed by the at least one processor, cause the computing device to provide the modified data object model to the rendering engine to cause the rendering engine to generate the graphical object color coded with the unique color code from the modified data object model.

7. The non-transitory computer readable storage medium as recited in claim 1, wherein the instructions, when executed by the at least one processor, cause the computing device to generate the structural construct by:
   determining the unique color code associated with the graphical object;
   identifying, within the mapping, the determined unique color code and the extracted attributes associated with the unique color code in the mapping; and
   applying the extracted attributes to the graphical object and substituting the unique color code associated with the graphical object with the original color listed within the extracted attributes.

8. The non-transitory computer readable storage medium as recited in claim 1, wherein the instructions, when executed by the at least one processor, cause the computing device to:
   generate the structural construct for the display element by generating a portable document format (PDF) graphical construct and one or more PDF tagging constructs for the display element; and
   assemble the PDF graphical construct and the one or more PDF tagging constructs into a finalized PDF document.

9. A system comprising:
   a memory comprising a data object model of a web page;
   computer readable instructions that, when executed by one or more computer processors, cause the system to perform steps comprising:
   parsing the data object model to extract attributes associated with nodes of the data object model;
   generating a mapping that associates unique color codes with the extracted attributes associated with nodes of the data object model;
   generating a modified data object model by replacing, within the data object model of the web page, original color codes with the unique color codes from the mapping;
   providing the modified data object model comprising the unique color codes to a rendering engine;
   accessing graphical objects color coded with the unique color codes output by the rendering engine;

generating portable document format (PDF) graphical constructs and PDF structural constructs from the graphical objects color coded with the unique color codes, the PDF structural constructs comprising original colors from the web page and the attributes; and generating a PDF document of the web page from the PDF graphical constructs and PDF structural constructs.

10. The system as recited in claim 9, wherein generating the mapping that associates a unique color codes with the extracted attributes associated with nodes of the data object model comprises, for each node in the data object model:

assigning a unique color code to a set of attributes associated with the node; and adding an entry to the mapping comprising the assigned unique color code and the set of attributes associated with the node.

11. The system as recited in claim 9, wherein parsing the data object model to extract attributes associated with nodes of the data object model comprises parsing the data object model to extract structural, semantic, and stylistic attributes for each node in the data object model.

12. The system as recited in claim 9, wherein generating the modified data object model by replacing original color codes with unique color codes from the mapping comprises, for each node in the data object model, overwriting the original color code in the extracted attributes associated with the node with the unique color code assigned to the extracted attributes in the mapping.

13. The system as recited in claim 11, wherein parsing the data object model to extract the structural, the semantic, and the stylistic attributes for each node in the data object model comprises parsing one or more CSS object models to extract the structural, the semantic, and the stylistic attributes associated with the web page.

14. The system as recited in claim 9, wherein generating PDF constructs from the graphical objects color coded with the unique color codes comprises, for each accessed graphical object:

determining the unique color code associated with the graphical object;

identifying, within the mapping, the determined unique color code and the extracted attributes associated with the unique color code in the mapping; and applying the extracted attributes to the graphical object and substituting the unique color code associated with the graphical object with an original color code listed within the extracted attributes.

15. The system as recited in claim 9, wherein:

wherein generating PDF graphical constructs and PDF structural constructs from the graphical objects color coded with the unique color codes comprises generating PDF graphical constructs and PDF tagging constructs; and generating a PDF document of the web page from the PDF graphical constructs and PDF structural constructs comprises assembling the PDF graphical constructs and the PDF tagging constructs into a tagged PDF document that replicates semantic, structural, and stylistic attributes of the web page represented by the data object model.

16. The system as recited in claim 9, the steps further comprising:

receiving a URL of the web page from a client computing device; and providing the PDF document for download to the client computing device.

17. In a digital environment for converting digital documents from one format to another format, a computer-implemented method of maintaining semantic information during document conversion comprising:

performing a step for generating a mapping that associates, for nodes of a data object model associated with a web page, attributes with unique color codes, the attributes comprising semantic, structural, and stylistic attributes of the web page;

generating a modified data object model by replacing, within the data object model associated with the web page, original color codes with the unique color codes from the mapping;

providing the modified data object model comprising the unique color codes to a rendering engine;

accessing graphical objects color coded with the unique color codes output by the rendering engine;

performing a step for generating structural constructs from the graphical objects color coded with the unique color codes that includes original colors and the attributes; and generating a document of the web page from the structural constructs.

18. The computer-implemented method as recited in claim 17, wherein generating the modified data object model by replacing original color codes with unique color codes from the mapping comprises, for each node in the data object model, overwriting an original color code listed in attributes associated with the node with a unique color code listed in the mapping that is assigned to the attributes associated with the node.

19. The computer-implemented method as recited in claim 17, wherein generating the document of the web page from the structural constructs comprises generating a portable document format (PDF) document corresponding to the web page.

20. The computer-implemented method as recited in claim 17, wherein performing the step for generating structural constructs from the graphical objects color coded with the unique color codes that includes original colors and the attributes comprises generating portable document format (PDF) graphical constructs, and PDF tagging constructs, the PDF tagging constructs comprising structural, hierarchical, and semantic attributes of the web page.

* * * * *